INVENTOR
JOHN T. CARY

Nov. 22, 1966    J. T. CARY    3,286,497
RECIPROCATING MULTIPLE DIE DEVICE FOR CAN CUTOFF
AND FLANGING BY MAGNETIC IMPULSE
Filed Feb. 5, 1964    5 Sheets-Sheet 3

INVENTOR
JOHN T. CARY

BY
Mason, Porter, Diller & Stewart
ATTORNEYS

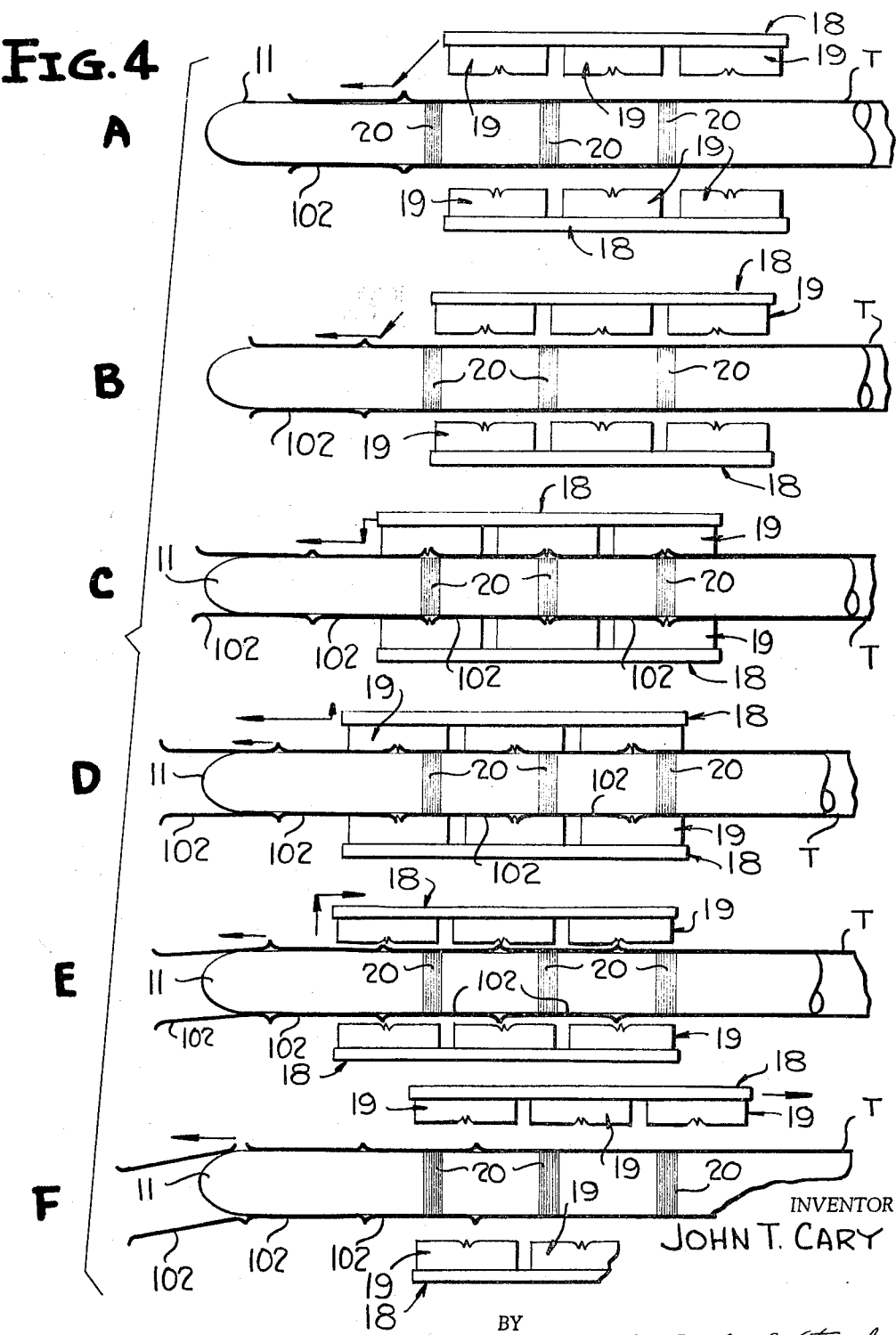

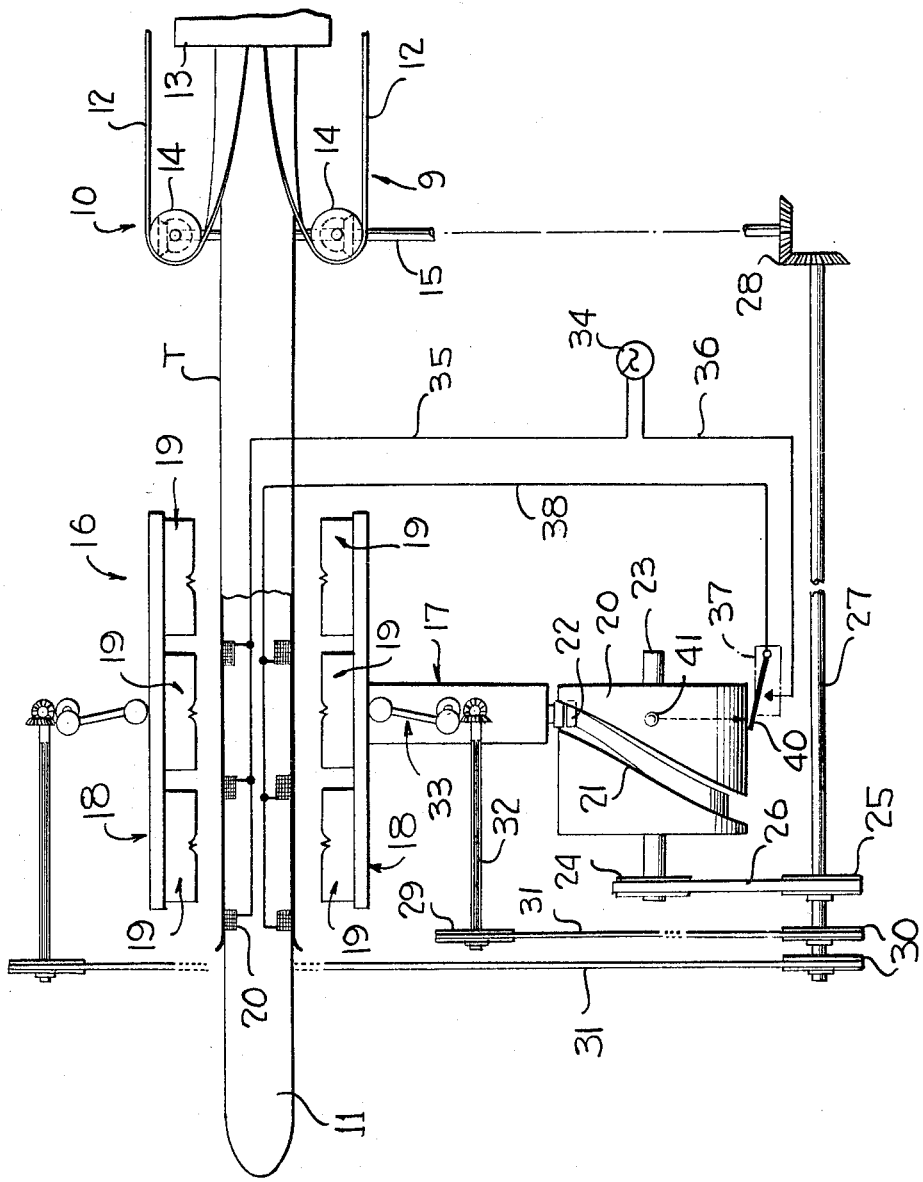

United States Patent Office 3,286,497
Patented Nov. 22, 1966

3,286,497
RECIPROCATING MULTIPLE DIE DEVICE FOR CAN CUTOFF AND FLANGING BY MAGNETIC IMPULSE
John T. Cary, Markham, Ill., assignor to Continental Can Company, Inc., New York, N.Y., a corporation of New York
Filed Feb. 5, 1964, Ser. No. 342,603
14 Claims. (Cl. 72—56)

This invention relates in general to new and useful improvements in the forming of can bodies, and more particularly relates to a novel apparatus for the repeated severing of a moving tube into predetermined lengths and effecting the flanging of the ends of such tube lengths.

A primary object of this invention is to provide a novel apparatus for receiving a moving tube and automatically severing the tube into accurate predetermined lengths and effecting the flanging thereof in a continuous operation.

Another object of this invention is to provide a novel apparatus for receiving a continuously moving tube and severing the tube into predetermined lengths, the severing of the tube being clean and substantially burr-free.

Another object of this invention is to provide a novel apparatus for effecting the severing of a continuously moving tube into tube portions of predetermined lengths, the apparatus utilizing a die which is closable about the tube and movable therewith at the same rate, and there being means for effecting the momentary expansion of the tube in alignment with the die wherein as the tube is expanded outwardly, the contact of the outwardly expanding tube with the die will effect the severing thereof.

A further object of this invention is to provide a novel apparatus for utilizing a magnetic impulse principle in the simultaneous cutoff and flanging of tube portions from a constantly moving tube, the apparatus including an impulse coil which is fixed within a tube support and an external die which is movable with the tube past the coil with the die being closed at the time it passes the coil and the coil being energized when the die is in alignment therewith to effect the outward expansion of the tube and the severing of the tube by its pressure engagement with the die.

Yet another object of this invention is to provide a novel apparatus for effecting the severing of a tube into tube portions of predetermined lengths and flanging the tube portions as they are formed, the apparatus being suitable for use with a tube making apparatus whereby immediately subsequent to the forming of the tube, it is severed into the predetermined lengths so that the length of the entire line may be reduced to a minimum and no extreme lengths of tubes will be unnecessarily handled.

Still another object of this invention is to provide a novel apparatus for simultaneously severing a moving tube into a plurality of predetermined lengths and effecting the severing thereof, the apparatus including a pair of first carriages which are reciprocable alongside a tube support in the general direction of tube movement and wherein a portion of the movement of the first carriages moves at the same rate as the rate of tube travel, and there being carried by the first carriages, second carriages, which are reciprocable in opposed relation toward and away from the tube support, the second carriages having mounted thereon a plurality thereof cooperating die halves, and the tube support carrying a plurality of devices in accordance with the number of pairs of die halves for the purpose of momentarily outwardly expanding a tube moving over the tube support, and the carriage and the tube expanding means being operated in synchronism with the movement of a tube over the tube support.

Still another object of this invention is to provide a novel method of dividing a continuously moving tube into a plurality of tube portions of a predetermined length, the method including the steps of surrounding the tube with a die and moving the die at the same rate as the tube and while the die is closed around the tube and moving therewith, momentarily outwardly expanding the tube to effect a pressure engagement of the tube with the die and the cutting or serving of the tube by its engagement with the die.

A further object of this invention is to provide a novel method of forming can bodies comprising the steps of supplying a continuously moving tube, engaging the tube at predetermined space intervals by cooperating die halves and moving the die halves at the same rate as the tube, and while the die halves are in cooperating relation passing the die halves over a device for outwardly expanding the tube in alignment with the die halves with the die halves being so shaped whereby pressure engagement of the tube with the die halves will first result in the severing of a tube portion from the tube and flanging of the opposed ends of the tube portion and the remainder of the tube in a continued further outward movement of the expanded parts of the tube portion and tube.

With the above and other objects in view that will hereinafter appear, the nature of the invention will be more clearly understood by reference to the following detailed description, the appended claims and the several views illustrated in the accompanying drawings.

In the drawings:

FIGURE 4 is a schematic plan view showing the manner in which the apparatus functions, the view showing step-by-step movement of the apparatus and including sections A through F, inclusive.

FIGURE 5 is a schematic view of the apparatus and the relationship thereof with tube towing means and shows the manner in which the tube cutoff apparatus is synchronized with the movement of a moving tube.

Figure 1:
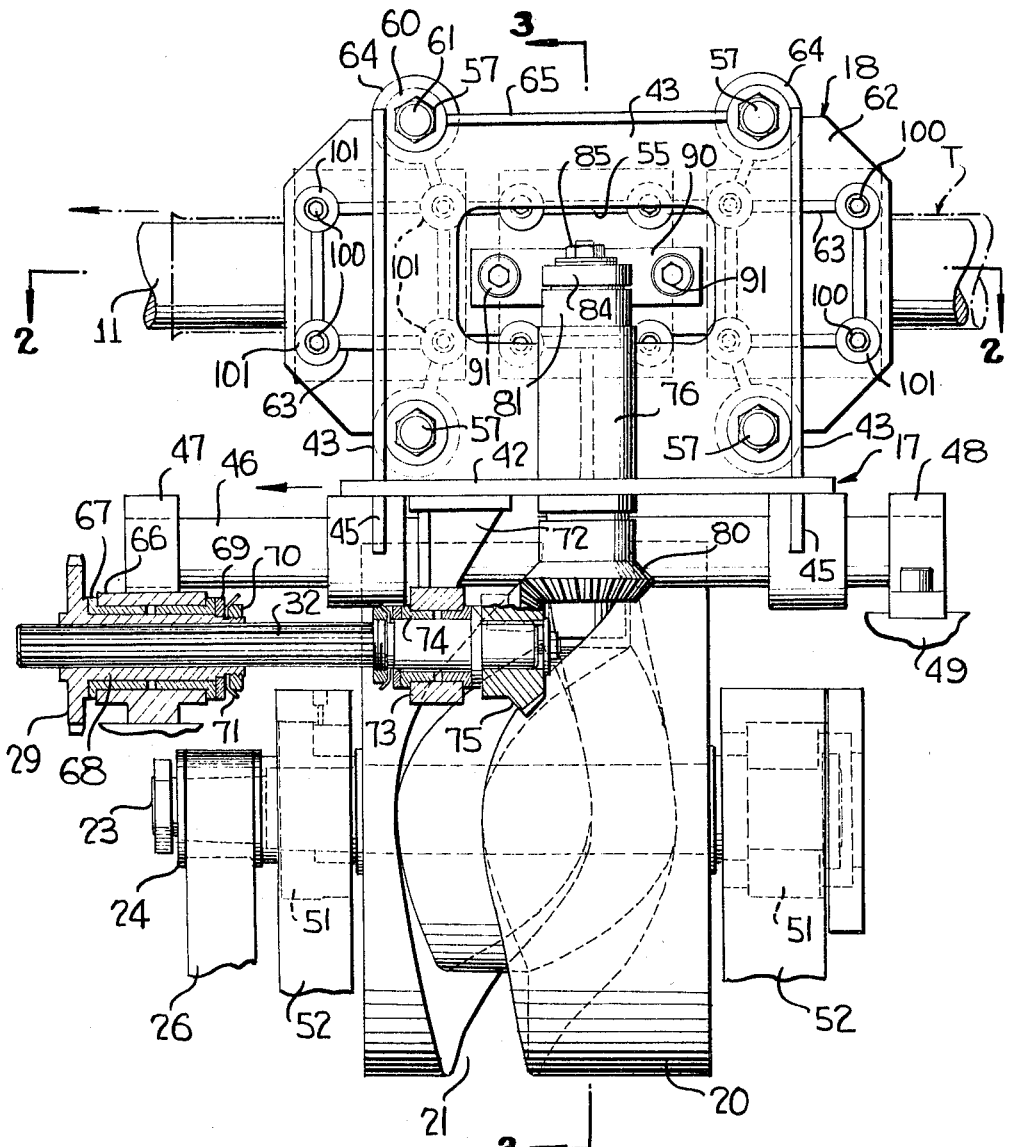
FIGURE 1 is an elevational view with parts broken away and shown in section of an apparatus formed in accordance with this invention and shows the relationship thereof with respect to a moving tube, the tube being shown in phantom lines.

Referring now to the drawings in detail, reference is first made to FIGURE 5 wherein it is illustrated an apparatus 4 supporting and moving a tube T, the apparatus being generally referred to by the numeral 10. The apparatus 10 includes a tube support 11 which is in the form of a horn. In accordance with this invention, the tube T may be newly formed in a continuous process as, for example, from a continuous strip which is shaped into tubular form and then is provided with a longitudinal seam. In the forming of the tube T, it is moved by a towing device, generally referred to by the numeral 9, of which only a portion has been shown. The towing device 9 includes a pair of towing belts 12 which are brought into tight engagement with the tube T by means of a clamping device 13. The belts 12 are driven by means of vertically disposed drums 14 which are driven in a suitable manner by means of a horizontally disposed shaft 15. The shaft 15 is driven in any desired manner, not shown.

The tube support 11 has associated therewith a cutoff and flanging mechanism in accordance with this invention, the cutoff and flanging mechanism being generally referred to by the numeral 16. The specific details of the mechanism 16 will be set forth hereinafter. However, for purpose of briefly describing the mechanism 16 and its relationship to the tube towing device 9, it is pointed out that the cutoff and flanging mechanism 16 includes a first carriage 17 which is mounted in a suitable manner to be described hereinafter for reciprocatory movement below the tube support 11. The carriage 17 carries a pair of second carriages 18 which are mounted in a suitable manner on the carriage 17 for movement therewith and for movement relative to the carriage 17 toward and away from the tube support 11. Each carriage 18 carries a plurality of die half units 19 with the die half units 19 of the two carriages 18 being disposed in alignment for cooperation with each other. In the illustrated form of the invention each carriage 18 carries three die half units 19 although the number may be varied as desired. The die half units 19 are spaced in accordance with the desired length of tube portion to be severed from the tube T.

In accordance with this invention, each cooperating pair of die half units 19 closes about the moving tube T and for a short period of time moves together with the tube T at the same rate. While the die half units 19 move with the tube T, the tube T is localized outwardly expanded into engagement with the die half units 19 so as to be severed and flanged thereby. The outward expansion of the tube may be accomplished in any desired manner. However, in the preferred embodiment of the invention it is accomplished by means of magnetic impulse. Accordingly, the tube support 11 is provided with a plurality of coils 20 which are countersunk therein. The coils 20 are of a number and spacing corresponding to the number and spacing of the die half units 19.

In order that the cutoff and flanging mechanism 16 will properly function, it is necessary that the operation thereof be synchronized with the movement of the tube T. To this end, the first carriage 17 is driven by means of a barrel cam 20 having a cam groove 21 which is configurated to effect the reciprocation of the first carriage 17 in timed relation to the movement of the tube T with that portion of the movement of the carriage 17 wherein the die half units 19 are closed about the tube T being at the same rate and in the same direction as the movement of the tube T. The carriage 17 is provided with a cam follower 22 which is seated within the cam groove 21.

The barrel cam 20 is carried by a shaft 23 which is provided at one end thereof with a pulley 24. The pulley 24 is aligned with a pulley 25 and coupled thereto by means of a timing belt 26 which assures the synchronism of movement of the pulleys 24 and 25. The pulley 25 is carried by a drive shaft 27 which is driven from the drive shaft 15 by suitable gearing 28.

The barrel cam 20 is specifically designed so that it makes one revoution in the time the tube T is removed a distance equal to the length of three of the tube portions to be severed therefrom. It is to be understood, however, that when the number of die half units 19 carried by each carriage 18 is varied, the shape and ratio of rotation of the barrel cam 20 will be varied.

Each of the second carriages 18 is reciprocated by means of a drive unit which includes a sprocket 29 that is fixed against movement other than rotary. Each drive sprocket 29 is driven from a drive sprocket 30 carried by the shaft 27 by means of a drive chain 31. For each of the sprockets 29 there is a drive shaft 32 which is carried by the first carriage 17 and reciprocated therewith. Each drive shaft 32 has a sliding driven engagement with its respective sprocket 29. The drive shaft 32, in turn, drives a rotary to reciprocating motion converting mechanism 33 to effect the reciprocation of the associated second carriage 18 in timed relation to the movement of the tube T.

It is to be understood that in order for the coils 20 to function to effect the repulsion of areas of the tube T it is necessary that a high current be pulsed through the coil 20 in timed relation to the movement of the tube T and the die half units 19. The manner of pulsing the current through the coils 20 is schematically illustrated as including a current generator 34 from which a wire 35 leads and is coupled to each of the coils 20. A second wire 36 leads to a control switch 37 and a third wire 38 leads from the control switch 37 to each of the coils 20. The control switch 37 is schematically illustrated as being provided with an actuator 40 which is engaged by a button or lobe 41 on the barrel cam 20. At this time it is pointed out that the invention is in no way restricted as to the manner in which the current may be pulsed through the coils 20 and, if desired, for example, there may be one current generator for each coil 20 and a separate switch for controlling the pulsing of the current through each coil 20. Of course, the switches would then be operated in unison.

Figure 2:
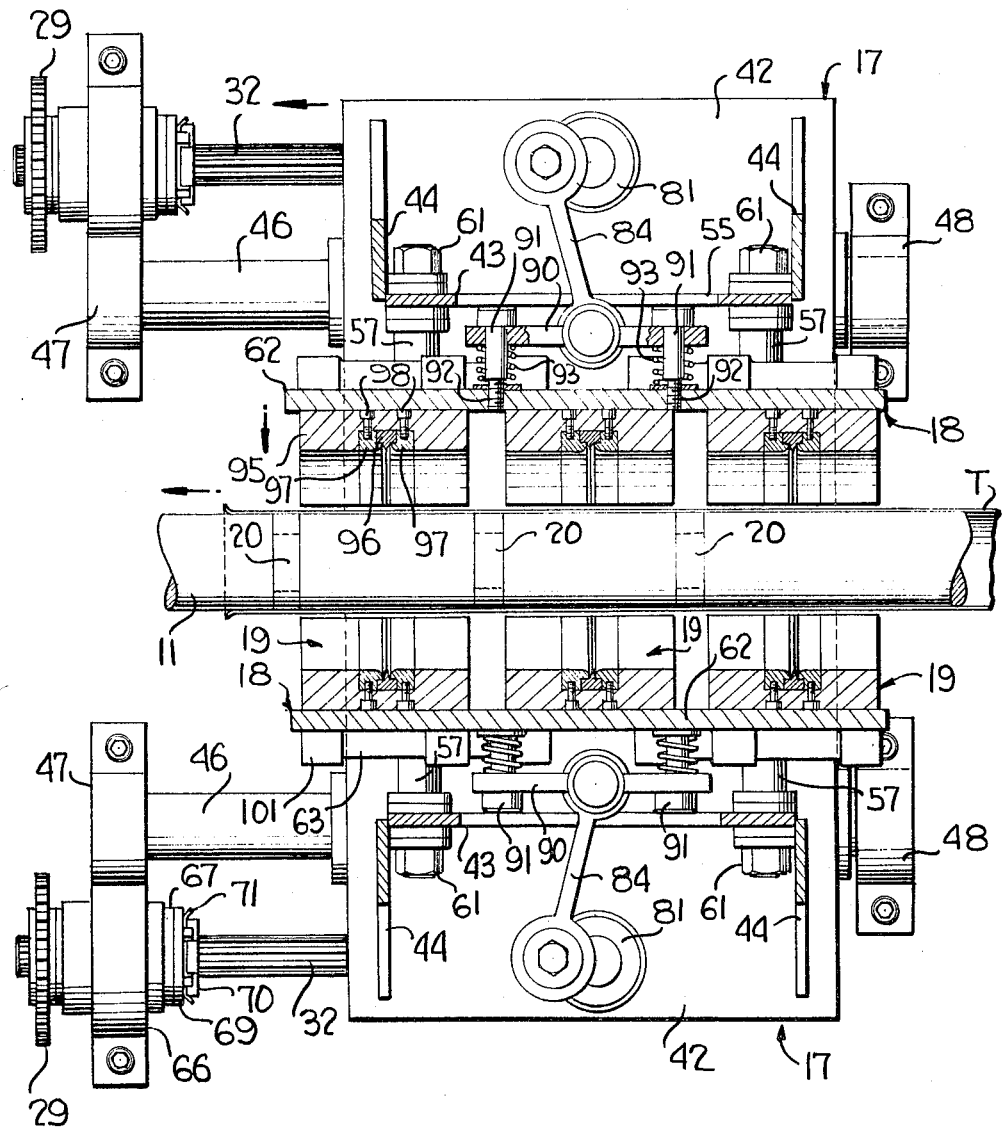
FIGURE 2 is a horizontal sectional view taken along the line 2—2 of FIGURE 1 and shows more specifically the details of the apparatus including the specific arrangement of the dies, the tube being illustrated in solid lines.
Figure 3:
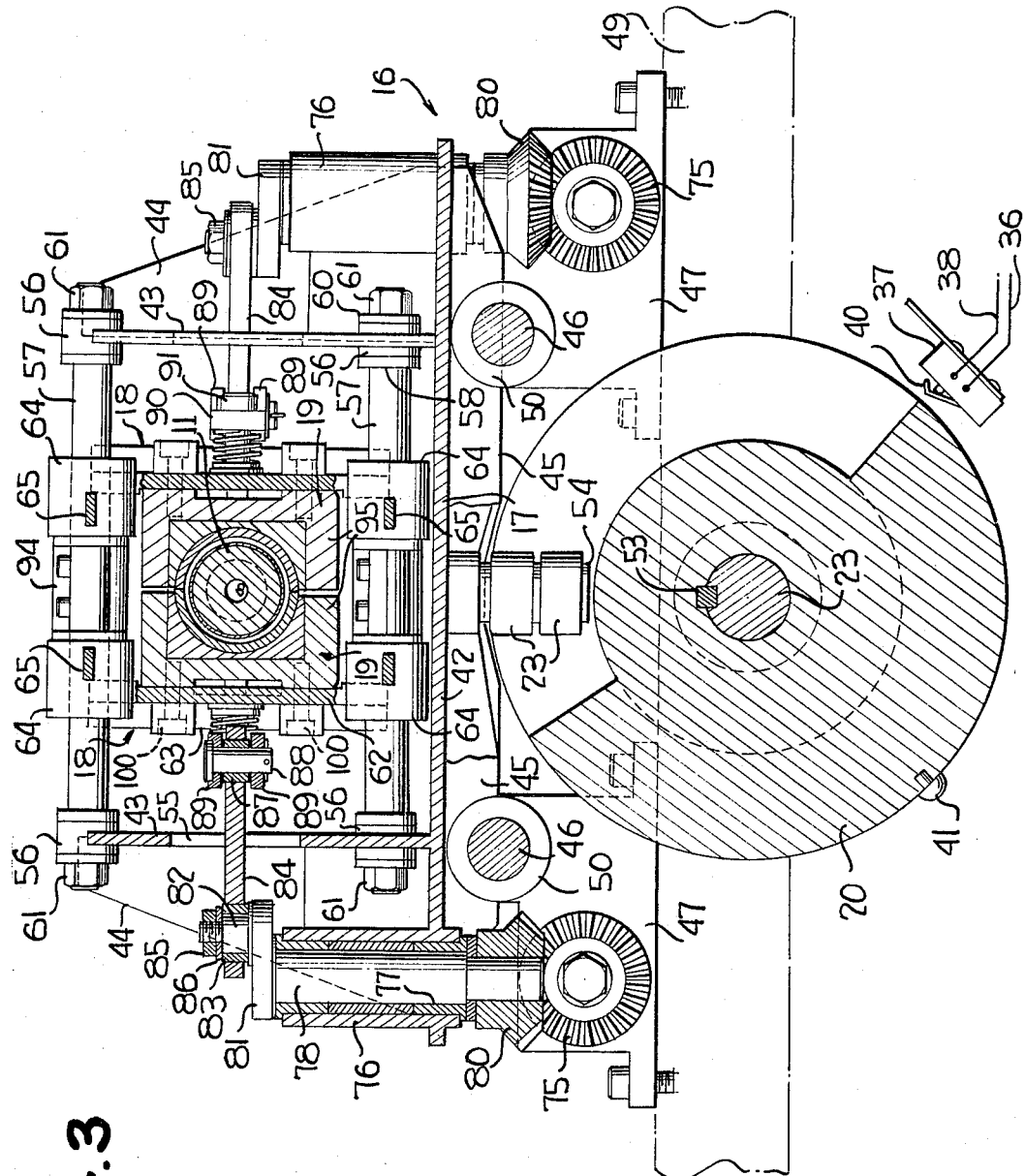
FIGURE 3 is a transverse vertical sectional view taken along the line 3—3 of FIGURE 1 and shows the specific relationship of the several carriages of the apparatus and the manner in which they are mounted for relative movement.

Reference is now made to FIGURES 1, 2 and 3 wherein the details of the cutoff and flanging mechanism 16 are more specifically shown. The first carriage 17 includes a horizontally disposed base plate 42 which is provided adjacent the longitudinal edges thereof and set inwardly therefrom a pair of upstanding plates 43. Each plate 43 is reinforced by a downwardly and outwardly sloping gusset 44 at each end thereof. The base plate 42 is also stiffened by a lower reinforcing rib 45 which underlies and is aligned with each pair of gussets 44.

The carriage 17 is mounted for guided movement along a pair of rails 46 which extend longitudinally of the tube support 11. The rails 46 are of a circular cross section and each rail 46 is supported at its opposite ends by brackets 47 and 48. The brackets 47 and 48 are, in turn, mounted on a suitable support 49 which is part of a supporting frame that is otherwise not set forth in detail. The brackets 47 differ from the brackets 46 in a manner to be described in more detail hereinafter. The first carriage 17 is provided with four guide sleeves 50 of which two are positioned on each of the rails 46. Each guide sleeve 50 is seated generally within a portion of one of the ribs 45 and generally engages the underside of the base plate 42, as is shown in FIGURE 3.

Referring now to FIGURE 1 in particular, it will be seen that the shaft 23 of the barrel cam 20 is rotatably journalled in bearings 51 which are carried by suitable supports 52. The supports 52, like the support 59, are parts of a machine frame.

Referring now to FIGURE 3 in particular, it will be seen that the barrel cam 20 is secured on the shaft 23 for rotation therewith by means of a key 53. It will also be seen that the cam follower 22 is of the double roller type and is carried by means of a supporting shaft 54 which is suitably secured to the base plate 42 in depending relation.

Referring now to FIGURE 1 in particular, it will be seen that each of the vertical plates 43 is rectangular in outline and is provided with a central, generally rectangular opening 55. Generally, at the four corners of each vertical plate 43 there is secured therein a bushing 56. The bushings 56 are best illustrated in FIGURE 3. The bushings 56 of the plates 43 are disposed in alignment, and four rails 57 extend between the plates 43 and have end portions thereof positioned within the bushings 56. Each end portion of each rail 57 is reduced and is provided with a washer 58 which bears against one end of an associated bushing 56. A second washer 60 engages the opposite end of the associated bushing 56 and the bushing 56 is clamped between the washers 58 and 60 by means of a nut 61 threaded onto the end of the rail 57. In this manner the rails 57 are securely anchored with respect to the vertical plates 43.

Each of the second carriages 18 includes a vertical plate 62 which has a smooth interface and the outer face of which is provided with ribbed reinforcements, 63. Each vertical plate 62 is provided with four guide sleeves 64 which are guidedly engaged on the rails 57 so as to determine the path of movement of the second carriages 18. These sleeves 64 are interconnected and braced by means of reinforcing straps 65.

Referring now to FIGURES 1 and 2 in particular, it will be seen that each of the support brackets 47 is provided with an extension 66 in which there is mounted a suitable bearing element 67. It will also be seen that each drive sprocket 29 is provided with a tubular extension 68 that is rotatably journalled in the bearing element 67. The tubular extension is retained in place within the bearing element 67 by means of a washer 69 and a nut 70 which is threadedly engaged on a reduced end portion of the tubular extension 68 and retained in an adjusted position by means of a lock washer 71. The tubular portion 68 is internally splined and has drivenly engaged therein an associated drive shaft 32.

For each of the drive shafts 32 the base plate 42 of the first carriage 17 has depending therefrom a bracket 72 which supports a bearing housing 73 in which there is mounted a suitable bearing 74. An intermediate portion of the drive shaft 32 is suitable journalled in the bearing 74 with the bearing 74 serving the dual function of connecting the drive shaft 32 to the carriage 17 for movement therewith. The drive shaft 32 extends through the bearing 74 and is provided at the end thereof remote from the sprocket 29 with a beveled gear 75.

Referring now to FIGURE 3 in particular, it will be seen that at each longitudinal side of the base plate 42 the first carriage 17 is provided with an integral upstanding sleeve 76. The sleeve 76 is provided with a suitable bearing assembly 77 and has rotatably journalled therein a vertically disposed shaft 78. The lower end of the shaft 78 is provided with a bevel gear 80 which is meshed with the bevel gear 75 and is driven thereby. The upper end of the shaft 78 has projecting therefrom a crank arm 81 which is provided with an upstanding crank pin 82. The crank pin 82 has mounted thereon by means of a bearing 83 one end of a connecting rod 84. The connecting rod 84 is retained on a crank pin 82 by means of a nut 85 and a washer 86 carried by a reduced end portion of the crank pin 82.

Each connecting rod 84 extends through the opening 55 in the associated vertical plate 43 and is provided at the opposite end thereof with a bearing 87 in which there is received a pin 88. The pin 88 passes both through the bearing 87 and a pair of collar portions 89 of a mounting bar 90 which is best shown in FIGURE 2. The mounting bar 90 is secured to the vertical plate 62 of the associated carriage 18 by means of a pair of headed pins 91. Each pin 91 is provided with a reduced end portion 92 that is suitably threaded into the associated vertical plate 62. A spring 93 is carried by each pin 91 between the mounting bar 90 and the vertical plate 62. The resilient mounting of the bar 90 assures the proper closing of the die half units 19 while preventing the jamming of the drive mechanism. In order to assure that the movement of the second carriages 18 toward one another is restricted to the extent that the die half units 19 are not damaged during the operation of the mechanism 16, each of the rails 57 may be provided with an intermediate stop unit 94 against which the guide sleeves 64 may engage.

Referring now to FIGURES 2 and 3 in particular, it will be seen that each of the die unit halves 19 includes a generally C-shaped die holder 95 which has seated in the central portion thereof a semi-circular cutting die 96. On each side of the cutting die 96, which is a shouldered construction, is a semi-circular flanging die 97. The two flanging dies 97 are secured in place in the die holder 95 by means of fasteners 98 and serve to clamp the cutting die 96 in position.

Each die holder 95 is clamped against the flat inner surface of an associated vertical plate 62 of its carriage 18 by four fasteners 100 which are disposed in a rectilinear pattern, as is clearly shown in FIGURE 1. At this time, it is also pointed out the ribbed reinforcement 63 on the outer surface of each vertical plate 62 includes sets of four bosses 101 which are disposed in the same rectilinear pattern as the fasteners 100 and which bosses receive the heads of the fasteners 100 in countersunk relation.

Reference is now made to FIGURE 4 wherein a complete cycle of operation of the mechanism 16 is illustrated. In FIGURE 4A the tube T is illustrated in an advanced position following a prior tube cutoff and flanging operation. The tube T is in a position slightly behind its position for the next cutoff and flanging operation. As the tube T advances, the second carriages 18, carried by the first carriage 17, move with the tube T and toward the tube T. At this time the carriages 17 and 18 are not moving quite as fast as the tube T.

Referring now to FIGURE 4B, it will be seen that the speed of the carriages 18 has reached that of the tube T and the carriages 18 together with the die half units 19, are moving in unison with the tube. At the same time, the carriages 18 are moving together with the die half units 19 being moved toward clamping engagement with the tube T.

In FIGURE 4C the carriages 18 are still moving at the same rate as the tube T and the die half units 19 have reached their fully closed positions. At the same time, the die half units 19 have become aligned with the coils 20 and in the position shown in FIGURE 4C the tube T has been outwardly expanded through the energization of each of the coils 20 so that localized portions of the tube T have been forcibly brought into engagement with the die half units 19.

It will be readily apparent from FIGURE 2 that when the tube T is localized outwardly expanded, each expanded portion of the tube T will first engage a cutting die 97 to effect the severing of the tube, after which the opposed tube ends will be further forced outwardly and guided by the flanging dies 97 to effect the flanging of the opposed tube ends.

In FIGURE 4D it is shown that immediately after the severing and flanging of the tube takes place, the carriages 18 begin to move apart so as to disengage the die half units 19 from the tube portions while the die half units continue to move with the tube and cutoff tube portions at the same rate of movement as the tube portions and tube.

Referring now to FIGURE 4E, it will be seen that after the die half units 19 move apart sufficiently to core the flanges formed on the tube portions and the new terminal end of the tube T, movement of the carriages 18 and the die half units 19 with the tube T discontinues and the direction of movement of the carriages 18 and the die half units 19 is reversed. While the tube continues to advance and push the newly formed tube portions off of the end of the tube support 11, the carriages 18 and the die half units 19 carried thereby continue to move apart and rearwardly, as shown in FIGURE 4F. The carriages 18 move slightly to the right, as viewed in FIGURE 4F to a position of reversal, generally shown in FIGURE 4A, at which point the carriages 18 again begin to move in the direction of travel of the tube T and the die half units 19 begin to move together as described with respect to FIGURE 4A.

It is to be noted that each tube portion, which is referred to by the numeral 102, is provided with flanged ends. Accordingly, each tube portion, as it exits from the tube support 11, is in the form of a can body to which can ends may be secured in the normal manner in the forming of cans.

It will be readily apparent from the foregoing that the cutoff and flanging mechanism 16 functions automatically and since it is driven in unison with the tube pulling mechanism 9, each tube portion 102 is of the desired length.

Although only a preferred embodiment of the invention

What is claimed is:

1. An apparatus for dividing a moving tube into predetermined lengths, said apparatus comprising a fixed tube support, means for advancing a tube along said tube support, a pair of cooperating die halves, first die half moving means for moving said die halves into and out of tube clamping relation, second die half moving means for reciprocating said die halves longitudinally of said tube support, means connected to said tube advancing means and said first and second die half moving means for opening and closing said die halves and longitudinally of said tube support in timed relation to the movement of a tube over said tube support, and means carried by said tube support for outwardly expanding a tube in alignment with said die halves with said die halves being closed.

2. The apparatus of claim 1 wherein there is a plurality of said die halves mounted in two sets on common supports for movement in unison with the die halves of each set being spaced in accordance with the desired tube length, and there is a plurality of said tube expanding means in accordance with the number of pairs of die halves.

3. The apparatus of claim 1 wherein said die halves include tube severing means and tube flanging means.

4. The apparatus of claim 1 wherein the apparatus is particularly adapted for use with tubes formed of electrically conductive material and said tube expanding means include a repulsion force generating coil.

5. An apparatus for dividing a moving tube into predetermined lengths, said apparatus comprising a fixed tube support, means for advancing a tube along said tube support, a pair of cooperating die halves, first die half moving means for moving said die halves into and out of tube clamping relation, second die half moving means for reciprocating said die halves longitudinally of said tube support, means carried by said tube support for outwardly expanding a tube, means connected to said tube advancing means and said first and second die half moving means for opening and closing said die halves and reciprocating said die halves in timed relation to the movement of a tube and effecting the encircling of a tube by said die halves at the predetermined spacing and while said die halves are moving past said tube expanding means at the same rate of movement as the encircled tube.

6. The apparatus of claim 5 wherein said die halves include tube severing means and tube flanging means.

7. The apparatus of claim 5 wherein the apparatus is particularly adapted for use with tubes formed of electrically conductive material and said tube expanding means include a repulsion force generating coil.

8. An apparatus for dividing a moving tube into predetermined lengths, said apparatus comprising a fixed tube support, means for advancing a tube along said tube support, a pair of cooperating die halves, first support members alongside said tube support, tube expanding means carried by said tube support, a first carriage mounted on said first support members for reciprocatory movement longitudinally of said tube support and parallel to the axis thereof, first drive means connected to said first carriage and said tube advancing means for reciprocating said first carriage in timed relation to the movement of a tube with a portion of the advance of said first carriage being at the speed of tube travel, second carriages, second support members mounting said second carriages on said first carriage for reciprocation towards and away from one another transversely of said tube support, second drive means connected to said second carriages and to said tube advancing means for transversely reciprocating said second carriages in timed relation to tube advancement, and cooperating die halves carried by said second carriages for cooperation with said tube expanding means to sever a tube.

9. An apparatus for dividing a moving tube into predetermined lengths, said apparatus comprising a fixed tube support, means for advancing a tube along said tube support, a pair of cooperating die halves, first support members alongside said tube support, tube expanding means carried by said tube support, a first carriage mounted on said first support members for reciprocatory movement longitudinally of said tube support and parallel to the axis thereof, first drive means connected to said first carriage and said tube advancing means for reciprocating said first carriage in timed relation to the movement of a tube with a portion of the advance of said first carriage being at the speed of tube travel, second carriages, second support members mounting said second carriages on said first carriage for reciprocation towards and away from one another transversely of said tube support, second drive means connected to said second carriages and to said tube advancing means for transversely reciprocating said second carriages in timed relation to tube advancement, and a plurality of die halves carried by each of said second carriages in longitudinally spaced relation in accordance with said predetermined length for cooperation with said tube expanding means to sever a tube.

10. The apparatus of claim 9 wherein said tube expanding means includes a tube expander for each pair of die halves.

11. The apparatus of claim 8 wherein said die halves include tube severing means and tube flanging means.

12. The apparatus of claim 8 wherein the apparatus is particularly adapted for use with tubes formed of electrically conductive material and said tube expanding means include a repulsion force generating coil.

13. The apparatus of claim 8 wherein said first drive means includes a rotating cam for said first carriage and a cam follower carried by said first carriage engaged with the rotating cam, said rotating cam being contoured to vary the rate and direction of movement of said first carriage.

14. The apparatus of claim 8 wherein said second drive means includes a drive element carried by each first support member and journalled for rotation, drive shafts supported by said first carriage and journalled for rotation, a sliding driving connection between each drive shaft and a respective one of said drive elements, and rotary to reciprocatory movement converting mechanisms carried by said first carriage and connected to respective ones of said drive shafts and respective ones of said second carriages.

References Cited by the Examiner

UNITED STATES PATENTS 2,177,104  10/1939  Sonser _____ 113—120
3,229,598  1/1966  Yovanovich _____ 93—80

FOREIGN PATENTS 606,110  5/1931  Germany.

CHARLES W. LANHAM, *Primary Examiner.*

R. J. HERBST, *Assistant Examiner.*